US005371322A

United States Patent [19]

Selmeski

[11] Patent Number: 5,371,322

[45] Date of Patent: Dec. 6, 1994

[54] ANTENNA WIRE COUPLING

[76] Inventor: Eugene D. Selmeski, 282 Warren Ave., Hawthorne, N.Y. 10532

[21] Appl. No.: 31,319

[22] Filed: Mar. 15, 1993

[51] Int. Cl.$^5$ .................... H02G 15/08

[52] U.S. Cl. .................... 174/84 R; 174/75 C; 174/88 C; 174/DIG. 8; 428/35.1

[58] Field of Search .................... 174/84 R, 88 R, 88 C, 174/75 C, DIG. 8; 428/35.1

[56] References Cited

U.S. PATENT DOCUMENTS

| | | | |
|---|---|---|---|
| 3,525,799 | 8/1970 | Ellis | 174/84 R |
| 3,787,607 | 1/1974 | Schlafly | 174/88 C |
| 3,818,123 | 6/1974 | Maltz et al. | 174/88 C |
| 3,842,191 | 10/1974 | Neale, Sr. | 174/88 R |
| 3,859,455 | 1/1975 | Gommans et al. | 174/88 C |
| 4,074,065 | 2/1978 | Leaf et al. | 174/87 |
| 4,144,404 | 3/1979 | De Groef et al. | 174/88 C |
| 4,341,921 | 7/1982 | Simpson | 174/84 R |
| 4,383,131 | 5/1983 | Clabburn | 174/88 C X |
| 4,595,724 | 6/1986 | Koblitz | 174/84 R X |
| 4,832,248 | 5/1989 | Soni et al. | 174/84 R |
| 4,883,925 | 11/1989 | Graf | 174/84 R |
| 5,015,512 | 5/1991 | Matsumoto | 174/84 R |

*Primary Examiner*—Morris H. Nimmo
*Attorney, Agent, or Firm*—E. Michael Combs

[57] ABSTRACT

A coupling of severed antenna wires is arranged to include a heat shrink tube having low temperature solder core arranged to secure respective first and second cable antenna wires together, wherein a metallic mesh connecting tube is arranged to electrically interconnect first and second cable mesh shields. An outer tubular insulative tube of flexible construction is arranged to surround the abutting end portions of the first and second antenna cables joined together.

2 Claims, 4 Drawing Sheets

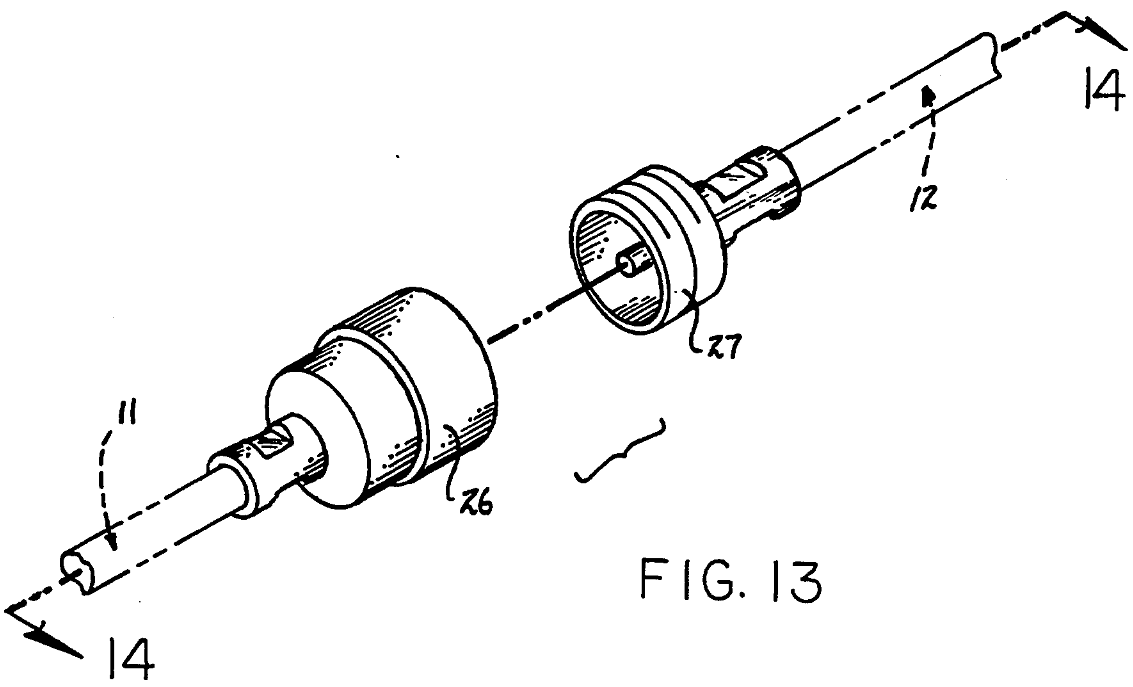
FIG. 13
FIG. 14
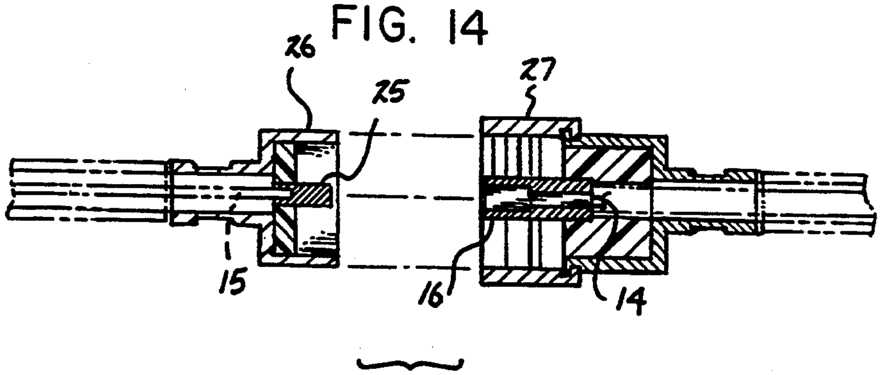

ANTENNA WIRE COUPLING

BACKGROUND OF THE INVENTION

1. Field of the Invention

The field of invention relates to electrical coupling structure, and more particularly pertains to a new and improved antenna wire coupling to permit the ease of assemblage of spaced antenna cables together.

2. Description of the Prior Art

Splicing of coaxial cables for example is indicated in the U.S. Pat. No. 3,787,607, wherein various insulative splicing is indicated in U.S. Pat. Nos. 4,074,065 and 3,842,191.

The instant invention attempts to overcome deficiencies of the prior art by providing for a coupling or splicing structure arranged to interconnect antenna wires such as employed in automotive vehicles and in this respect, the present invention substantially fulfills this need.

SUMMARY OF THE INVENTION

In view of the foregoing disadvantages inherent in the known types of coupling apparatus now present in the prior art, the present invention provides an antenna wire coupling wherein the same is arranged to interconnect severed antenna cables employing a central heat shrink tube. As such, the general purpose of the present invention, which will be described subsequently in greater detail, is to provide a new and improved antenna wire coupling which has all the advantages of the prior art coupling apparatus and none of the disadvantages.

To attain this, the present invention provides a coupling of severed antenna wires arranged to include a heat shrink tube having low temperature solder core arranged to secure respective first and second cable antenna wires together, wherein a metallic mesh connecting tube is arranged to electrically interconnect first and second cable mesh shields. An outer tubular insulative tube of flexible construction is arranged to surround the abutting end portions of the first and second antenna cables joined together.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved antenna wire coupling which has all the advantages of the prior art coupling apparatus and none of the disadvantages.

It is another object of the present invention to provide a new and improved antenna wire coupling which may be easily and efficiently manufactured and marketed.

It is a further object of the present invention to provide a new and improved antenna wire coupling which is of a durable and reliable construction.

An even further object of the present invention is to provide a new and improved antenna wire coupling which is susceptible of a low cost of manufacture with regard to both materials and labor, and which accordingly is then susceptible of low prices of sale to the consuming public, thereby making such antenna wire couplings economically available to the buying public.

Still yet another object of the present invention is to provide a new and improved antenna wire coupling which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 13 is an isometric illustration arranged to include male and female couplers relative to opposed antenna wires.

FIG. 14 is an orthographic view, taken along the lines 14—14 of FIG. 13 in the direction indicated by the arrows.

DESCRIPTION OF THE PREFERRED EMBODIMENT

Figure 1:
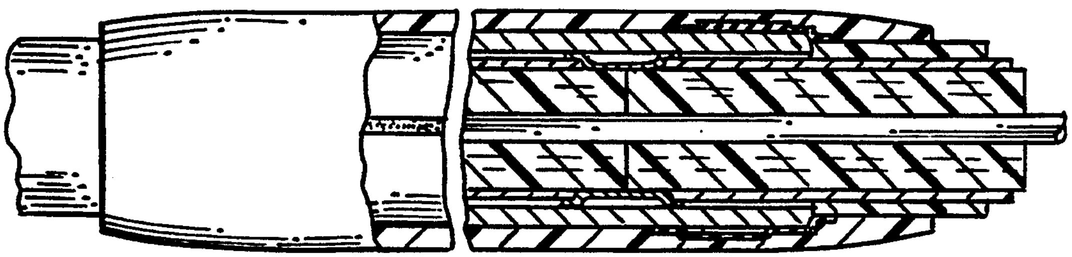
FIG. 1 PRIOR ART
FIG. 1 is an orthographic view of a prior art coaxial cable splice, as indicated in U.S. Pat. No. 3,787,607.
Figure 2:
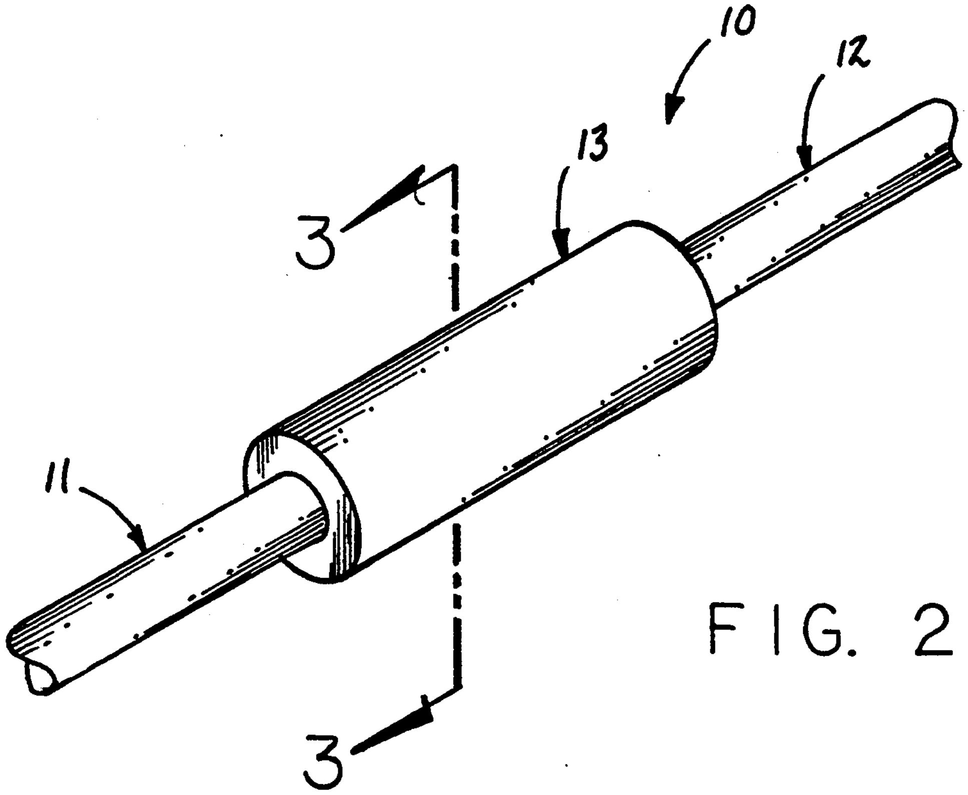
FIG. 2 is an isometric illustration of the coupling of the invention to secure confronting antenna wires together.

With reference now to the drawings, and in particular to FIGS. 1 to 14 thereof, a new and improved antenna wire coupling embodying the principles and concepts of the present invention and generally designated by the reference numeral 10 will be described.

Figure 4:
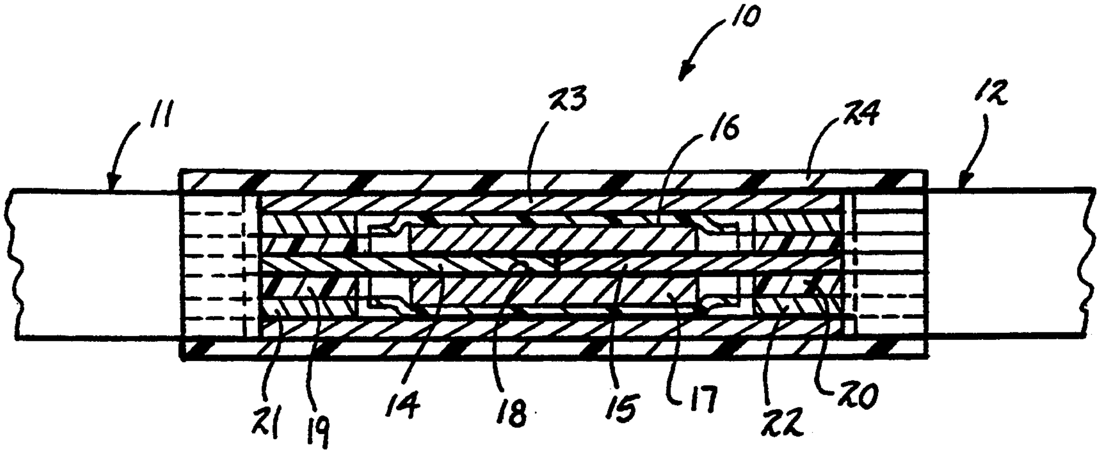
FIG. 4 is an orthographic view, taken along the lines 4—4 of FIG. 3 in the direction indicated by the arrows.
Figure 3:
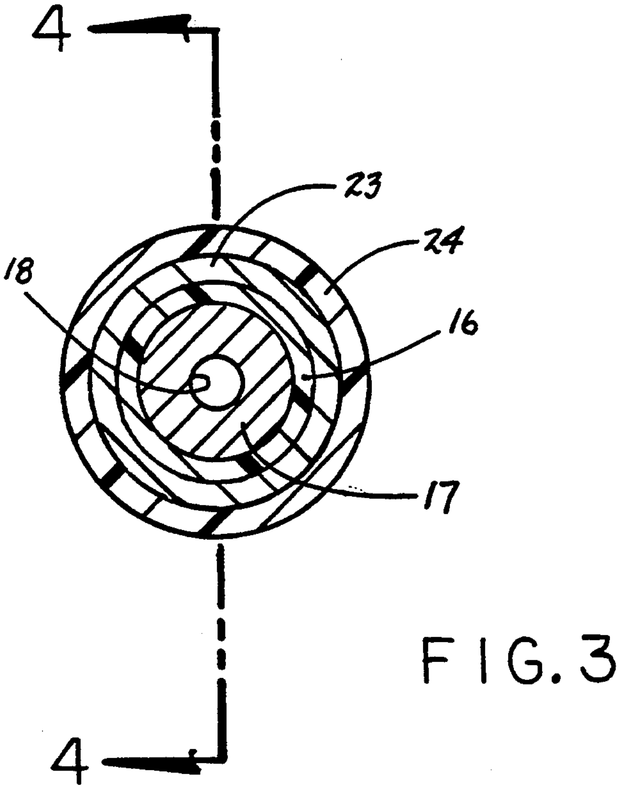
FIG. 3 is an orthographic view, taken along the lines 3—3 of FIG. 2 in the direction indicated by the arrows.
Figure 5:
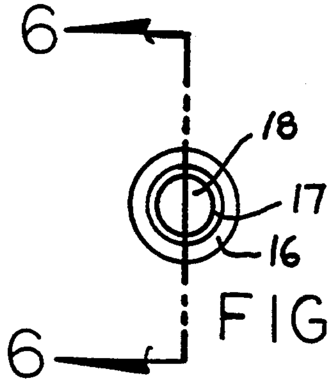
FIG. 5 is an orthographic end view of the central heat shrink tube of the invention.
Figure 6:
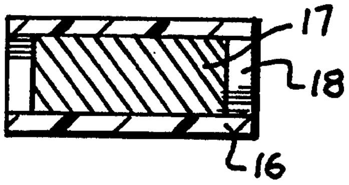
FIG. 6 is an orthographic view, taken along the lines 6—6 of FIG. 5 in the direction indicated by the arrows.
Figure 7:
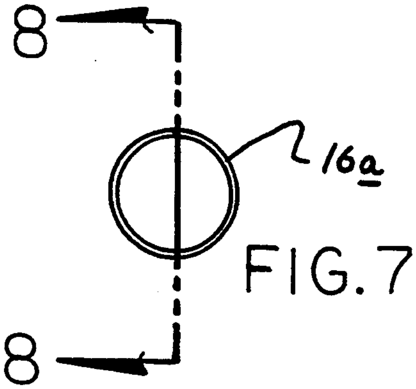
FIG. 7 is an orthographic end view of a further heat shrink tube availed for use by the invention.
Figure 8:
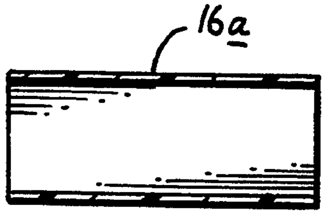
FIG. 8 is an orthographic view, taken along the lines 8—8 of FIG. 7 in the direction indicated by the arrows.
Figure 9:
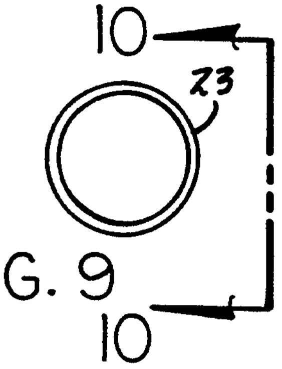
FIG. 9 is an orthographic end view of a metallic mesh connecting tube as employed by the invention.
Figure 10:
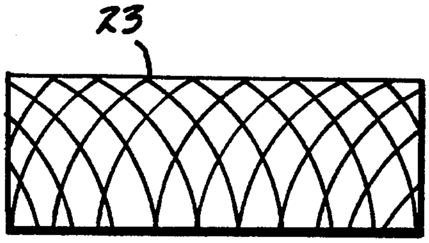
FIG. 10 is an orthographic view, taken along the lines 10—10 of FIG. 9 in the direction indicated by the arrows.
Figure 11:
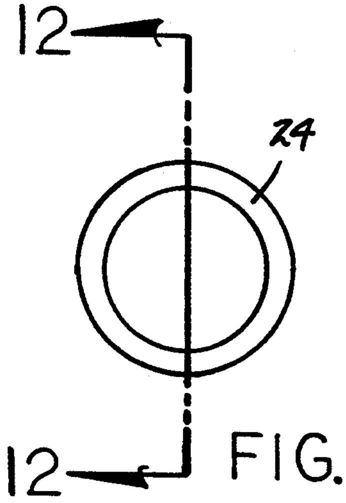
FIG. 11 is an orthographic end view of flexible outer tubular polymeric tube structure as employed by the invention.
Figure 12:
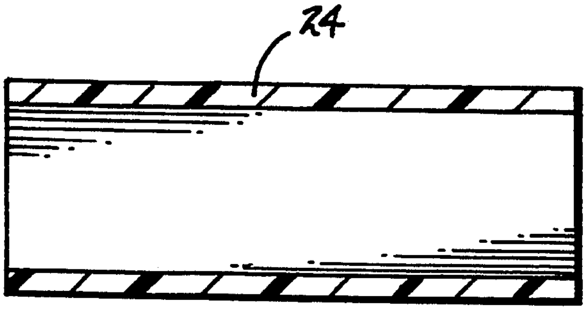
FIG. 12 is an orthographic view, taken along the lines 12—12 of FIG. 11 in the direction indicated by the arrows.

More specifically, the antenna wire coupling 10 of the instant invention essentially comprises first and second antenna cables 11 and 12, each having a respective first and second cable antenna wire 14 and 15 medially of the respective first and second antenna cables 11 and 12. Initially, the outermost covering of the antenna cables is stripped to expose the antenna wires 14 and 15, as well as the respective first and second cable metallic mesh tubular shields 21 and 22 that are arranged in surrounding concentric relationship relative to the first and second cable antenna wires 14 and 15, with first and second cable insulative tubes 19 and 20 oriented between the respective shields and the antenna wires of the respective first and second antenna cables 11 and 12. As indicated in FIG. 4, a heat shrink tube 16 is provided having a low temperature solder cylindrical core 17 therewithin, with the core including a central bore 18 to receive the first and second cable antenna wires 14 and 15 within the bore 18. Heat is applied to solder the first and second cable antenna wires 14 and 15 together, as well as affording electrical communication therebetween, whereupon simultaneously the heat shrink tube provides insulation about the wires 14 and 15. A metallic mesh connecting tube 23 extends to receive within its opposite ends the respective first and second cable metallic mesh tubular shields 21 and 22 of the first and second antenna cables 11 and 12. Subsequently, a flexible outer tubular polymeric tube 24 is positioned over the joint to insulate such joint binding the structure together, whereupon the outer tube 24 may be initially positioned about one of the first and second antenna cables 11 or 12 and then subsequent to the joining of the cable antenna wires 14 and 15 and the shields 21 and 22, the outer tube 24 is slid into position over the joint, in a manner as indicated in FIG. 4. Typically, the outer tube 24 is flexible and may also be formed of a resilient material to enhance its displacement and subsequent joining in a sealing relationship relative to the ends of the first and second antenna cables 11 and 12. As indicated in FIG. 8, if necessary, a further heat shrink tube 16a may be provided should an additional outer layer be required to provide proper positioning of the metallic mesh connecting tube 23 and thereby interposed between the metallic mesh connecting tube 23 and the heat shrink tube 16 in use.

The FIGS. 13 and 14 indicates the use of respective male and female couplers 26 and 27 as an alternative employment of the invention secured to the respective second and first antenna cables 11 and 12. The first antenna wire 14 is arranged to receive the heat shrink tube 16 secured to that antenna wire, wherein a second antenna wire mounting boss 25 is arranged for securement to the second antenna wire, whereupon the second antenna wire mounting boss 25 is accordingly received within the heat shrink tube 16 that remains open for access of the second antenna ware mounting boss 25 when the male and female couplers 26 and 27 are joined together.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An antenna wire coupling arrangement comprising a first antenna cable having a first cable antenna wire and a first cable insulative tube positioned around the first cable antenna wire, and a first cable metallic mesh tubular shield oriented about the first cable insulative tube, and a first cable insulative housing positioned about the first cable metallic tubular shield, and a second antenna cable having a second cable antenna wire including a second cable insulative tube positioned about the second cable antenna wire, with a second cable metallic mesh tubular shield oriented about the second cable insulative tube, and a second cable insulative housing positioned about the second cable metallic mesh tubular shield, a heat shrink tube having a low temperature solder cylindrical core positioned within the heat shrink tube, with the low temperature solder cylindrical core including a central bore receiving a first free end of the first cable antenna wire and a second free end of the second cable antenna wire within the central bore, and a metallic mesh connecting tube receiving the first cable metallic mesh tubular shield and the second cable metallic mesh tubular shield therewithin, wherein the metallic mesh connecting tube is arranged in surrounding relationship relative to the heat shrink tube and to the first free end and the second free end.

2. A coupling as set forth in claim 1 including a resilient flexible outer tubular polymeric tube positioned in surrounding relationship about the metallic mesh connecting tube, with the flexible outer tubular polymeric tube receiving the first cable insulative housing and the second cable insulative housing therewithin in an aligned relationship.

* * * * *